(12) United States Patent
Ziskind et al.

(10) Patent No.: US 9,307,361 B2
(45) Date of Patent: Apr. 5, 2016

(54) START AND STOP MOVING NOTIFICATION TRIGGERS FOR LOCATION BASED TRACKING

(71) Applicant: ZOS Communications, LLC, Webster, NY (US)

(72) Inventors: Russell Ziskind, Webster, NY (US); Anthony Audi, Rochester, NY (US); Chris McKechney, Marion, NY (US)

(73) Assignee: ZOS Communications, LLC, Webster, NY (US)

( * ) Notice: Subject to any disclaimer, the term of this patent is extended or adjusted under 35 U.S.C. 154(b) by 0 days.

(21) Appl. No.: 14/667,618

(22) Filed: Mar. 24, 2015

(65) Prior Publication Data

US 2015/0271639 A1 Sep. 24, 2015

Related U.S. Application Data (60) Provisional application No. 61/969,614, filed on Mar. 24, 2014, provisional application No. 62/078,393, filed on Nov. 11, 2014.

(51) Int. Cl.
  *H04W 24/00* (2009.01)
  *H04W 4/02* (2009.01)
(52) U.S. Cl.
  CPC ..................... *H04W 4/021* (2013.01)
(58) Field of Classification Search
  CPC .............................. H04W 64/00; H04W 48/04
  See application file for complete search history.

(56) References Cited

U.S. PATENT DOCUMENTS

| | | | | |
|---|---|---|---|---|
| 8,977,296 B1* | 3/2015 | Briggs | ................ | H04W 64/003 455/456.1 |
| 2011/0112768 A1* | 5/2011 | Doyle | .................... | G06Q 10/08 701/300 |
| 2012/0008526 A1* | 1/2012 | Borghei | ................ | H04W 4/021 370/254 |
| 2013/0225196 A1* | 8/2013 | James | .................... | H04W 4/028 455/456.1 |
| 2013/0310053 A1* | 11/2013 | Srivastava | ................ | G01S 5/02 455/446 |
| 2013/0324166 A1* | 12/2013 | Mian | ..................... | H04W 4/021 455/457 |
| 2013/0326137 A1* | 12/2013 | Bilange | ............... | G06F 12/0866 711/113 |
| 2014/0258201 A1* | 9/2014 | Finlow-Bates | .......... | G01S 19/42 706/46 |
| 2015/0271638 A1* | 9/2015 | Menayas | ............... | H04W 4/206 455/456.3 |

\* cited by examiner

*Primary Examiner* — Vladimir Magloire
*Assistant Examiner* — Shantell L Heiber
(74) *Attorney, Agent, or Firm* — Richards Patent Law P.C.

(57) ABSTRACT

A tracking system in which positioning alerts are communicated to a first user device from a second user device, the tracking system including a positioning sensor that determines a current location of the second user device; a controller in communication with the positioning sensor; and a memory including instructions to: receive a first set of current locations from the positioning sensor, generate, at a start of a candidacy period, a candidate geofence including the first set, receive a second set of current locations from the positioning sensor, when, by an end of the candidacy period, the entirety of the second is within the candidate geofence, communicate a stop motion message to the first user device, receive a third set of current locations from the positioning sensor, and when any of the third set is outside an active geofence, communicate a start motion message to the first user device.

10 Claims, 8 Drawing Sheets

START AND STOP MOVING NOTIFICATION TRIGGERS FOR LOCATION BASED TRACKING

CROSS-REFERENCE TO RELATED APPLICATIONS

This application incorporates by reference and claims the benefit of priority to U.S. Provisional Patent Application No. 61/969,614 filed Mar. 24, 2014, and U.S. Provisional Patent Application No. 62/078,393 filed Nov. 11, 2014.

BACKGROUND OF THE INVENTION

The present subject matter relates generally to a device for location-based tracking. More specifically, the present invention relates to a device carried by a user that alerts other users when a given device has started or stopped moving without requiring pre-defined geofences.

Location-aware tracking devices usually work using pre-defined geofences. For example, if a parent was trying to track a child's movements, the parent might draw a geofence around the child's school. When the child enters or exits the pre-defined geofence, the parent will receive a notification on an external system configured to alert the parent.

Existing technology requires that users of location-based tracking draw these geofences in order to receive the notifications. This requirement creates flaws in the system. First, drawing geofences can be time-consuming and error-prone. But more importantly, the user may not know ahead of time all the areas where geofences should be drawn. For example, a parent might draw a geofence around their child's school because the parent knows the child goes to school everyday. But the parent would not draw geofences around the other locations the child might visit after school. So if the child went to a friend's house after school, the parent would receive a notification when the child left school but not when the child left the friend's house.

Accordingly, there is a need for a location-based tracking mechanism that includes start and stop motion triggers and does not require pre-defined geofences, as described herein.

BRIEF SUMMARY OF THE INVENTION

To meet the needs described above and others, the present disclosure provides a location-based tracking system for tracking an asset. The location-based tracking system includes start and stop motion triggers and do not require pre-defined geofences.

By providing start and stop motion triggers, the user may track an asset by receiving notices when the asset stops and when the asset starts moving again. This allows the user to track the asset without having prior knowledge of where the device will be located when the conditions for location-based tracking will be met. Additionally, once the asset has stopped moving, the location-based tracking mechanism may automatically create a geofence around the asset such that the user will receive a notification when the asset has left the newly defined area.

The user may track the asset by tagging the asset with an asset device that is capable of detecting motion and is linked with a user device that may receive notifications. A tracking server may be in communication with the asset device and the user device to track the asset device and provide start motion and stop motion messages to the user device. The asset device, the tracking server, and a user device, or a combination of the three, may accomplish the tracking of the asset device as will be understood based on the teachings provided herein.

The asset device may be configured such that it determines its current location once it detects motion. Once the asset device moves a given distance, the tracking system may notify the user device of the movement event. The user device may include mobile devices or email accounts that have been configured to receive notifications when the start and stop motion triggers have been met.

In some embodiments, the tracking system may be configured so that it does not send a stop motion notification until the asset device has stopped moving for a set amount of time, such as one minute or five minutes. In one example, a parent may place the asset device on a child's backpack. Then, if the child stows his backpack in a locker when she arrives at school, the asset device may remain stationary long enough to trigger the stop notification.

Additionally, once the asset device stops, the tracking system may automatically create its own geofence so that only movement outside of the area creates a notification. For example, if the asset device is stopped for the pre-determined amount of time, the tracking system may automatically construct an active geofence with a given pre-determined radius, such as ten meters. The asset device may move within that radius without triggering a start motion message. But once the asset device moves outside of the active geofence, the start motion trigger will be met and the user device may receive a notification saying that the asset has started moving, which indicates that the device has left the radial geofence location. In some embodiments, if the asset device moves outside of the active geofence but re-enters the active geofence before the end of the delay time, the active geofence may be expanded to include the location points outside the active geofence during that period.

In one embodiment, the tracking system may use a continuous test method that periodically generates a candidate geofence encompassing the current location of the asset device. The tracking system may then monitor the location of the asset device for a candidacy period. If the asset device does not exit the candidate geofence at any time during the candidacy period, the tracking system may determine the stop motion trigger is met. Further, if the asset device does not exit the candidate geofence within the candidacy period, the candidate geofence may be confirmed as the active geofence for that location. If, at the end of the candidacy period, the candidate geofence and the active geofence overlap, the tracking system may merge the candidate geofence and the active geofence into a merged geofence and make it the active geofence.

The start motion message and the stop motion message may be communicated to the user device as notifications through a variety of notification channels, such as SMS messaging, push messaging, email messaging, phone calls, social network messaging, mobile device notifications, etc. Notifications may include the current locations of the asset device and may include a mechanism to access a map showing the real-time location history of the asset to permit the user to track the asset.

An object of the invention is to provide a solution to location-based tracking that notifies the user when a device starts or stops moving, without having pre-knowledge of where the device is located when the conditions are met.

An advantage of the invention is that it provides a solution to location-based tracking that alerts the user if the device stops anywhere, and not just at the places where the user has created a geofence.

Another advantage of the invention is that it takes less time to implement because the user does not have to draw geofences.

A further advantage of the invention is that it may be customized to deliver alerts after the device has stopped for a set amount time or moved outside a set radius.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
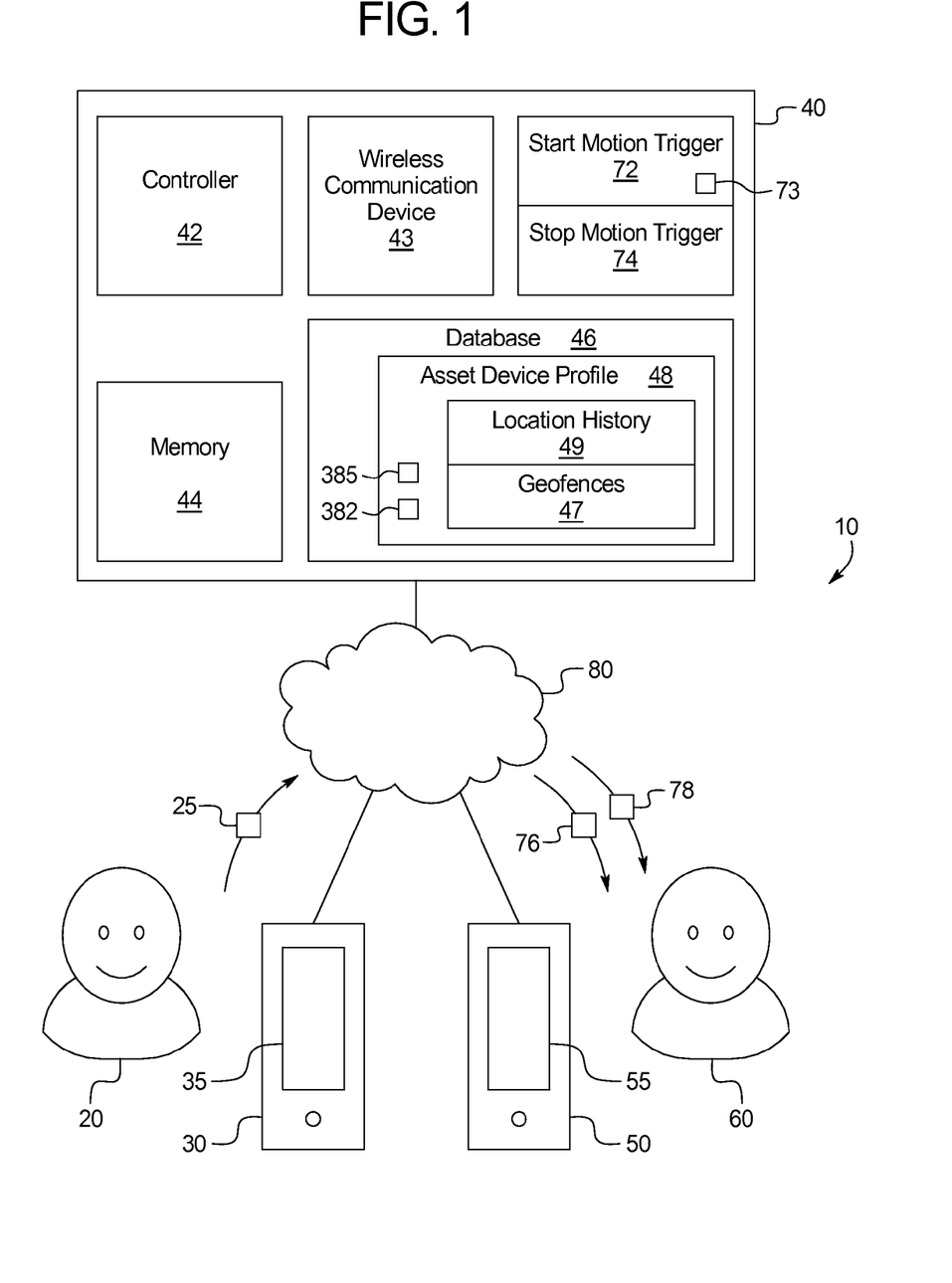
FIG. 1 is a schematic diagram illustrating an example of the tracking system.

FIG. 1 illustrates an example location-based tracking system 10. A moving asset 20, such as a child, may carry an asset device 30. The asset device 30 may be in communication with a tracking server 40 over the Internet 80. The tracking server 40 may, in turn, be in communication with a user device 50. The asset device 30 may routinely determine its current location 25 using, for example, GPS positioning, and share the current location 25 with the tracking server 40 for inclusion in a location history 49 stored in the profile 48 for the asset device 30 stored in the database 46. In various embodiments, the tracking system 10 may include: the asset device 30; the tracking server 40; the asset device 30 and the tracking server 40; the asset device 30, the tracking server 40, and the user device 50, or any other combination of asset devices 30, tracking servers 40, and user devices 50.

In an embodiment, the tracking server 40 may routinely compare the asset's location history 49 with a start motion trigger 72 and a stop motion trigger 74 to determine whether the asset 20 has started or stopped moving, respectively. When the location history 49 of an asset 20 matches or "triggers" a start motion trigger 72, the tracking system 10 may communicate a start motion message 76 to the user device 50 and/or trigger other functionality associated with the start motion trigger 72. Likewise, when the location history 49 matches a stop motion trigger 74, the system may in turn communicate a stop motion message 78 to the user device 50 and/or carry out functionality previously associated with a stop motion trigger 74.

As used herein, a start motion trigger 72 is a criterion or criteria monitored by the asset device 30 or the tracking server 40 that when met triggers a start motion message 76. Likewise, a stop motion trigger 74 is a criterion or criteria monitored by the device that when met triggers a stop motion message 78. The triggering of a start motion message 76 or a stop motion message 78 may in turn trigger user notifications and other functionality. For example, when the user device 50 receives a start motion message 76, it may display a start motion notification 410 (FIG. 4A) to notify the user 60 that the asset 20 has started moving. Likewise, when the user device 50 receives a stop motion message 78, the user device 50 may display a stop motion notification 420 (FIG. 4B) to notify the user 60 that the asset 20 has stopped moving.

Figure 2:
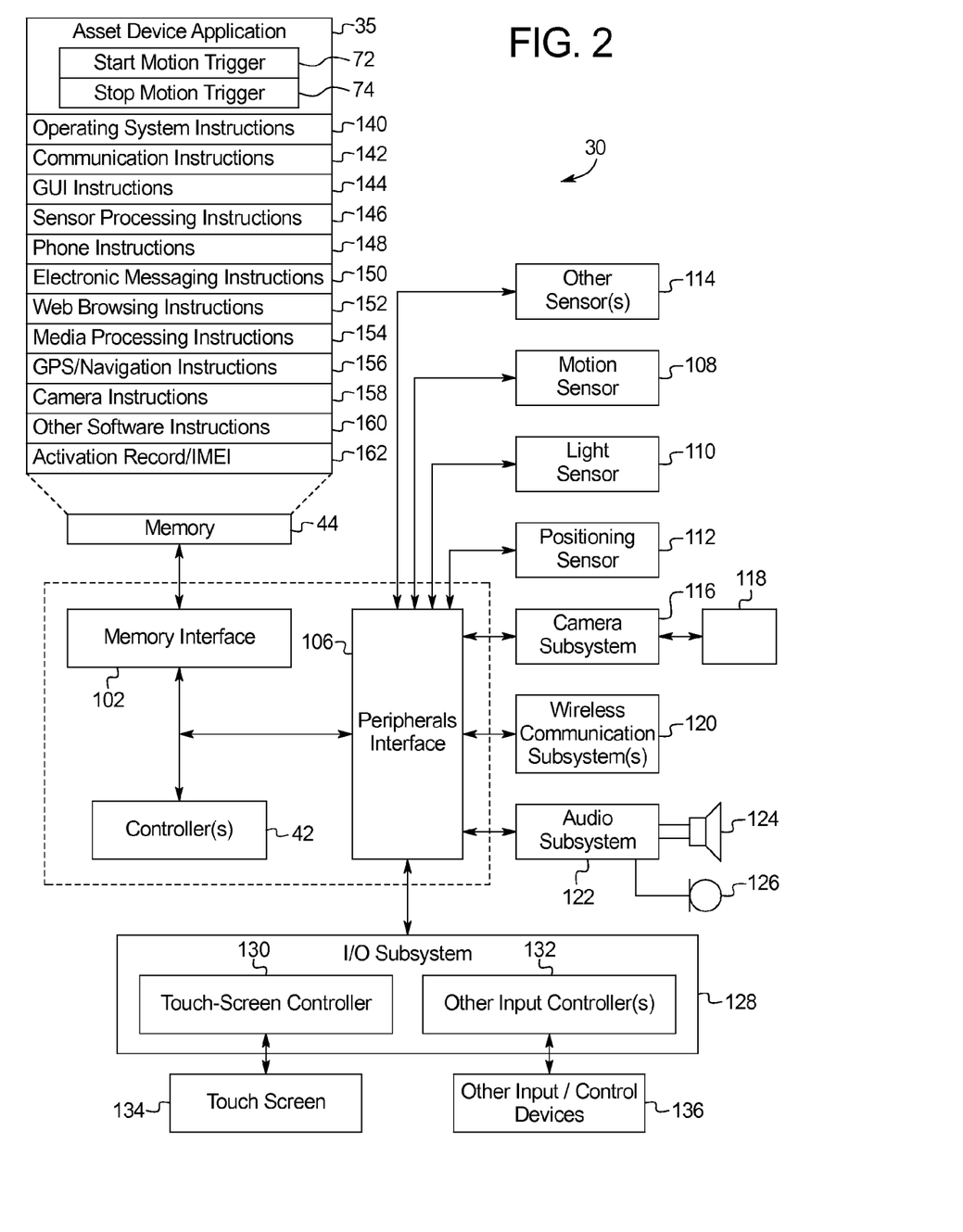
FIG. 2 is a schematic diagram illustrating an example asset device of the tracking system.

As shown in FIG. 2, the asset device 30 may be a mobile device, such as a smartphone, running an asset device application 35 to provide the functionality described herein. In an embodiment, the asset device application may include a start motion trigger 72 and a stop motion trigger 74 to carry out the functionality described herein. The asset device 30 may include wireless communication subsystem 120 to communicate with the tracking server 40 and the user device 50. The asset device 30 may further include a positioning sensor 112 to detect the current location 25 of the asset device 30, the positioning sensor 112 may include a GPS unit and/or may include functionality for cellular triangulation, Wi-Fi positioning, etc. In some embodiments, the asset device 30 may carry out some or all of the functionality of the tracking server 40. For example, the asset device 30 may include the controller 42, memory 44, database 46, etc., and the controller 42 of the asset device 30 may determine when start motion triggers 72 and stop motion triggers 74 have been met.

The user device 50 may also be a mobile device, such as a smartphone. Alternatively, the user device may be a cloud-based computer. The user device 50 may be used by a parent to track a child, a business tracking a physical asset, etc. The user device 50 may include a wireless communication subsystem 120 to communicate with the tracking server 40 and the asset device 30. The user device 50 may include a user device application 55 to carry out the functionality of the user device 50 as described herein.

The user device application 55 may use an API of the tracking server 40 to control the behavior of the tracking server 40 when the start motion trigger 72 and the stop motion trigger 74 are met. For example, the user device application 55 may provide a web callback URL that is triggered upon a start motion trigger 72 and/or stop motion trigger 74. The web callback URL may be point to a resource of the user device 50 or may point to a resource of another web-connected computer.

It is contemplated that the tracking system 10, in addition to being provided as an independent system for tracking an asset 20, may be provided as a subsystem as a part of a third party application. In an embodiment, the tracking server 40 provides tracking services to a third-party application developer that has provided the asset device application 35 and the user device application 55. The third party application developer may adapt the asset device application 35 and the user device application 55 to interact with the tracking server 40 via an application programming interface (API). In this way, the third party application developer may eliminate the costly development of location tracking functionality.

The third party application developer may define functionality that occurs when a start motion trigger 72 or stop motion trigger 74 is triggered. For example, when a start motion trigger 72 is met, the tracking server 40 may use a web URL callback 386 to communicate the start motion message 76 to the user device 50. Likewise, when a stop motion trigger 74 is triggered, the tracking server may use a web URL callback 386 to communicate the stop motion message 78 to the user device 50. The web URL callback 386 may include an identification of the asset 20 or asset device 30, an identification of the trigger (such as a start motion trigger 72 or stop motion trigger 74), a message, etc.

Figure 3A:
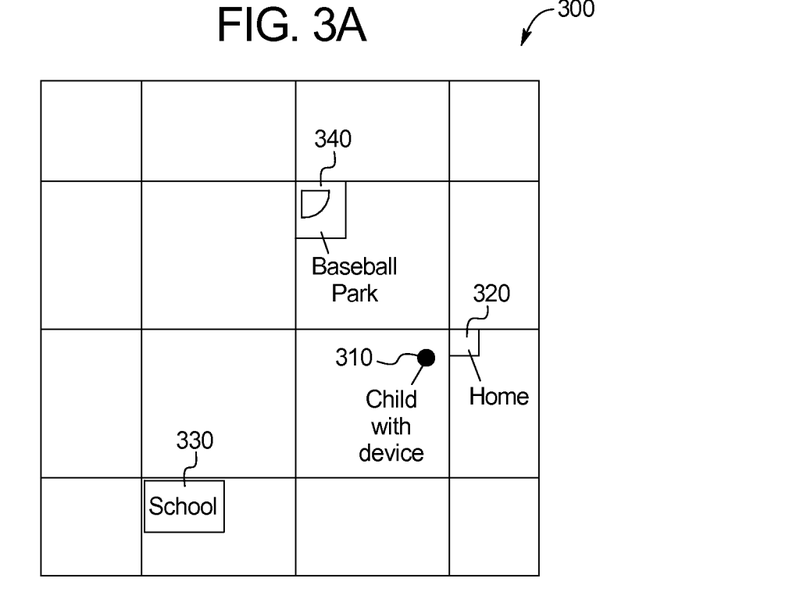
FIG. 3A is a map illustrating an example scenario illustrating the use of the tracking system including a child traveling from home to school to a baseball park.

FIGS. 3A-3F illustrate an example of the process of using an asset device 30 of the location-based tracking system 10 in various locations. FIG. 3A shows a map 300 of an exemplary environment for using the asset device 30. The map 300 includes three locations that a child 310 carrying the asset device 30 will travel between—home 320, school 330 and the baseball park 340.

Figure 3B:
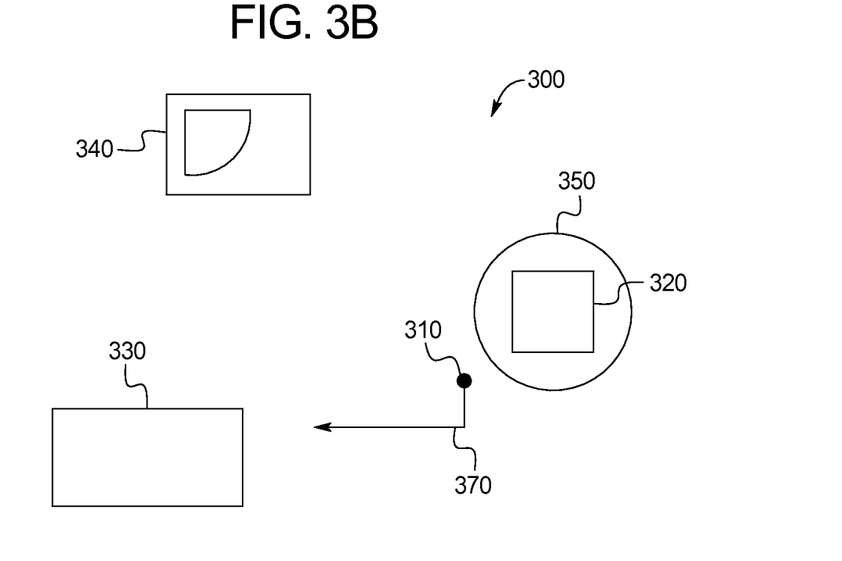
FIG. 3B is a map diagram illustrating a start motion trigger being met when a child leaves a home.

FIG. 3B illustrates the child 310 leaving the home 320 and heading to school 330. An active geofence 350 is currently in place to detect when the child 310 leaves home 320. As the child 310 moves along the path 320 to school 330, the child's current location 25 may be periodically compared against the active geofence 350. When the child 310 is detected outside the active geofence 350, the start motion trigger 72 may be met. The start motion trigger 72 may be associated with a start motion message 76 that may be communicated to a user device 50. Alternatively, when the start motion trigger 72 is met, the system may execute functionality previously associated with the start motion trigger 72. For example, the tracking system 10 may be configured to trigger an SMS notification to the user device 50 when the start motion trigger 72 is triggered.

In another embodiment, a start motion trigger 72 is met when the asset device 30 is moving at a velocity indicating travel, for example, the asset 20 is traveling in a car. In another embodiment, a start motion trigger 72 may be met by a series of measurements of location points 380 (FIG. 3B-3F) along a substantially straight line indicating that the asset 20 is moving directionally. In further embodiments, the acceleration of the asset device 30, as may be measured by an accelerometer of the positioning sensor 112, may be used to determine that the asset device 30 is moving in a car. For example, the start motion trigger 72 may be met when the asset device 30 exceeds a threshold acceleration.

Once the start motion trigger 72 has been met, the tracking system 10 may continuously monitor the current location 25 of the asset device 30 to determine if the asset 20 has stopped at another location. The location history 49 may be periodically updated with the current location 25. It is contemplated that the asset 20 maintaining the same location for a period of time is not necessarily sufficient to determine being whether the asset 20 "stopped" at the location. For example, once the child 310 has reached school 330, the child 310 may be detected as in motion as she moves from classroom to classroom, even though for the purpose of the user 60 tracking the child 310, the child 310 is considered by the user 60 to be stopped at the school 330.

Accordingly, in an embodiment, a stop motion trigger 72 may be met when an asset 20 has stayed within a candidate geofence 380 for a predetermined candidacy period 382. The tracking system 10 may use a continuous test method that periodically generates a candidate geofence 380 encompassing the current location 25 of the asset device 30. The tracking system 10 may then monitor the location of the asset device 30 for a candidacy period 382. If the asset device 30 does not exit the candidate geofence 380 at any time during the candidacy period, the tracking system 10 may determine the stop motion trigger 72 is met. Further, if the asset device 30 does not exit the candidate geofence 380 within the candidacy period 382, the candidate geofence 380 may be confirmed as the active geofence 350 for that location.

In an embodiment, the candidate geofence 380 may be centered on the current location 25 and may encompass a predefined radius 385 around the current location 25. The candidacy period 382 and the predefined radius 385 may be set by the user 60 using the user device 50. The candidacy period 382 and the predefined radius 385 may be stored in the profile 48. The user 60 may adjust the candidacy period 382 to increase or decrease the sensitivity of the tracking system 10 to improve precision, sensitivity, accuracy, etc. Alternatively, the candidacy period 382 and the predefined radius 385 may be a fixed parameter of the tracking system 10.

Figure 3C:
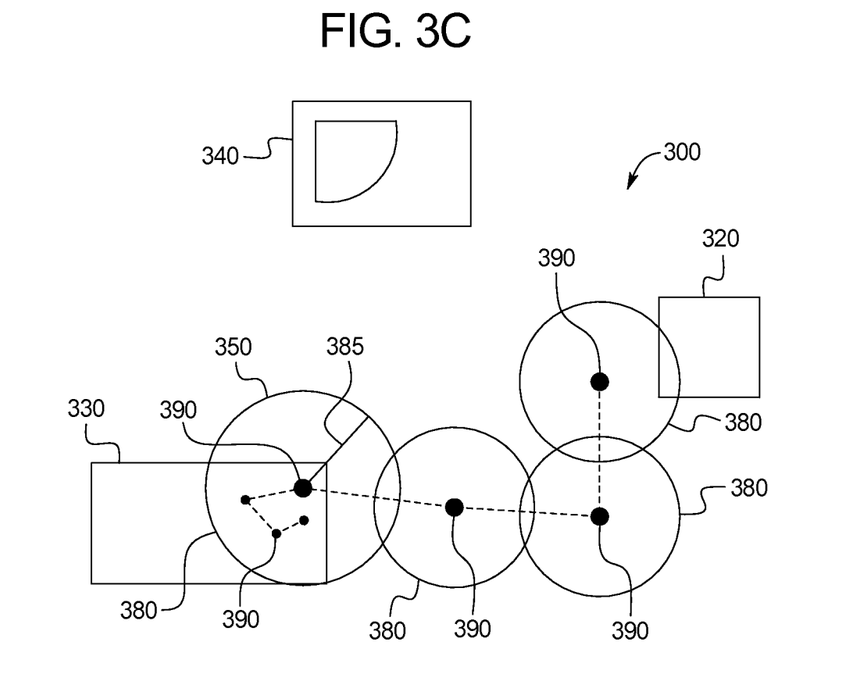
FIG. 3C is a map diagram illustrating a stop motion trigger being met when a child arrives at school.

In FIG. 3C, once the child 310 reaches the school 330 and stops, the location-based tracking system 10 may determine that a stop motion trigger 74 has been met and may, in turn, communicate a stop motion message 76 to the user device 50. The stop motion message 76 that may then be displayed to the user 60 as a stop motion notification 420 (FIG. 4B) informing the user 60 that the child 310 has stopped. Additionally, the tracking system 10 may generate a geofence 47 at the current location 25. For example, when, by the end of the period, all of the one or more location points 390 are within the candidate geofence 380, the tracking system 10 may accept the candidate geofence 380 as the active geofence 350.

Additionally, the tracking system 10 may modify the candidate geofence 47 before making it the active geofence 350. Modification of the candidate geofence 47 permits the tracking system 10 to create an active geofence 350 that accurately outlines the location the asset 20 has stopped at. For example, the candidate geofence 380 may be increased or decreased in size and then made the active geofence 350. Or, the candidate geofence 350 may be reshaped to take into account nearby streets. In an embodiment, the candidate geofence 350 may be expanded or contracted to match the edges of nearby streets or buildings, as may be determined by referencing a mapping database. When reshaping the candidate geofence 350, the candidate geofence 350 may be expanded after the reshaping to provide an additional buffer margin.

Figure 3D:
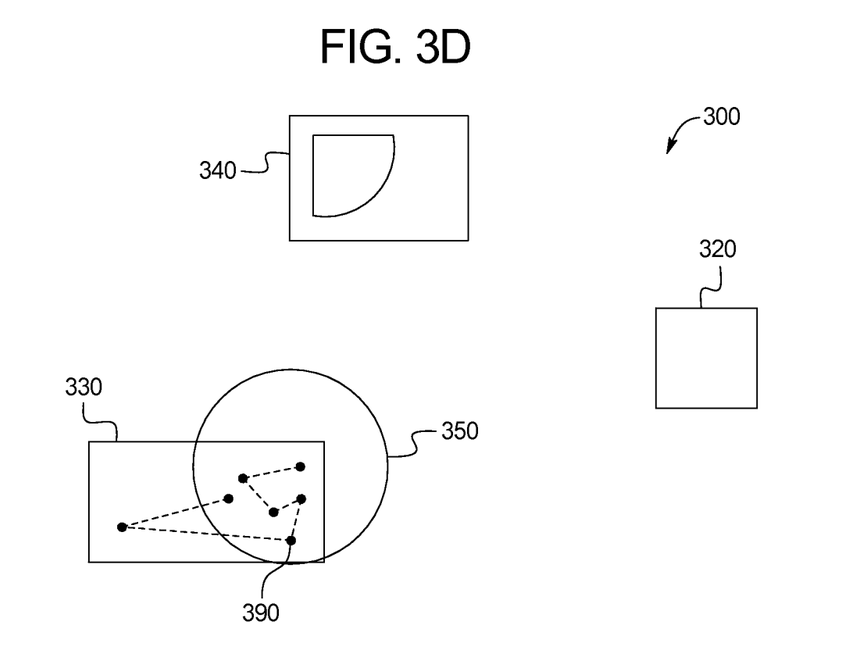
FIG. 3D is a map diagram illustrating a delay period to delay the triggering of a start motion trigger.

As shown in FIG. 3D, in some embodiments, the start motion trigger 72 may include a delay time 73 to prevent incorrect triggering. For example, when a user device 50 moves outside of an active geofence 350, the location-based tracking system 10 may wait until the end of the delay time 73 before making a determination that the start motion trigger 72 has been met. If the asset device 30 re-enters the active geofence 350 during the delay time 73, then the start motion trigger 72 is not met. However, if by the end of the delay time 73, the asset device 30 has not re-entered the active geofence 350, the start motion trigger 72 may be met and a start motion message 76 may be sent to the user device 50. In some embodiments, if the asset device 30 moves outside of the active geofence 350 but re-enters the active geofence 350 before the end of the delay time 73, the active geofence 350 may be expanded to include the location points 390 outside the active geofence 350 during that period.

Figure 3E:
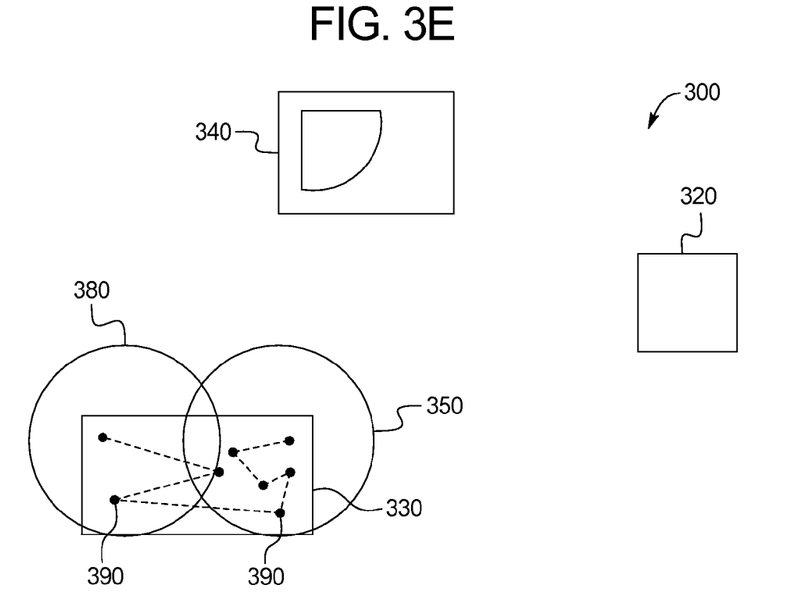
FIG. 3E is a map diagram illustrating the merger of two geofences into a merged geofence.

Turning to FIG. 3E, in some embodiments, overlapping or nearby geofences 47 may be automatically merged to form a larger geofence 47 to provide adaptive discovery of the boundaries of a location. For example, if a child 310 is at school 330, geofences 47 may be generated and stored in the profile 48 for each classroom of the child 310 as the child 310 moves around the school 330. However, since the geofences 47 are nearby each other, a larger geofence 47 may be generated to encompass all of the smaller geofences 47. It is contemplated that geofences 47 may be generated by a variety of methods, and that multiple methods may be used simultaneously and combined to provide for greater accuracy in geofence generation.

In one embodiment, detailed in FIG. 3E, when the child 310 exits the active geofence 350, the tracking system 10 may begin using the continuous test method described with respect to FIG. 3C to test for a stop motion trigger 72. For example, the tracking system 10 may generate candidate geofences 380 be centered on the current location 25 of the asset device 30. If, at the end of the candidacy period 382, the candidate geofence 380 and the active geofence 350 overlap, the tracking system 10 may merge the candidate geofence 380 and the active geofence 350 into a merged geofence 354 (FIG. 3F) and make it the active geofence 350.

Figure 3F:
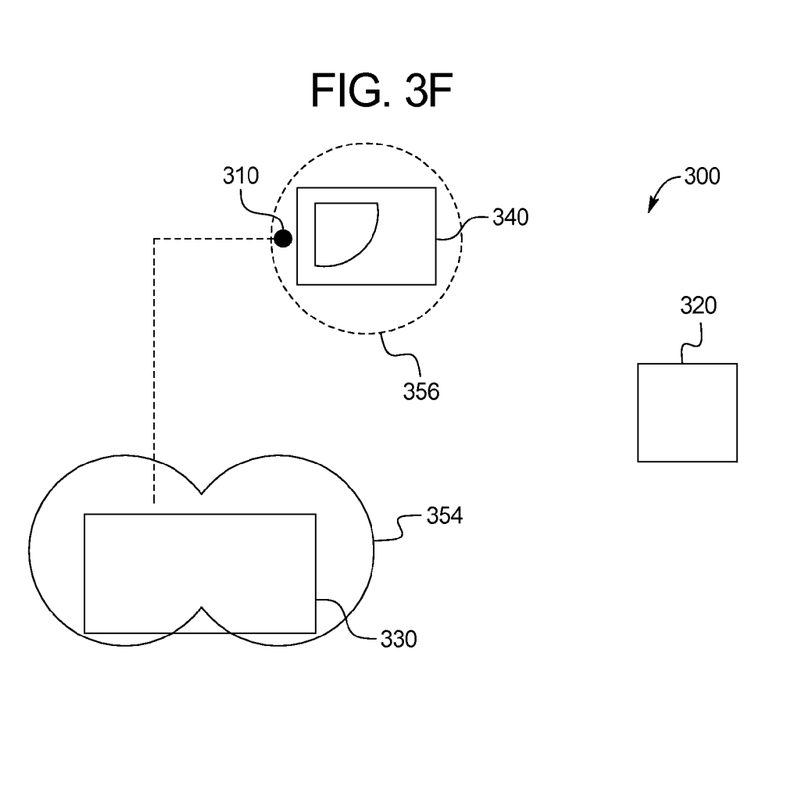
FIG. 3F is a map diagram illustrating a child entering a predefined geofence.

Turning to FIG. 3F, in an embodiment, a stop motion trigger 72 may be met by the asset device 30 entering a previously created geofence 47. FIG. 3F shows the child 310 having left the school 330 and making his way to the baseball park 340. Once the child 310 exits the merged geofence 354 surrounding the school 330, the user device 50 may receive a start motion notification 410 (as shown in FIG. 4A) that the child 310 has started moving.

A previously defined geofence 356 encompassing the baseball park 340 may be stored in the profile 48. Once the asset device 30 has passed into the previously defined geofence 356, a stop motion trigger 78 may be met. Accordingly, the user device 50 may receive a stop motion notification 420 (FIG. 4) that the asset 20 and the asset device 30 have stopped. The tracking system 10 may then make the previously defined geofence 356 the active geofence 350 for the start motion trigger 72.

Figure 4A:
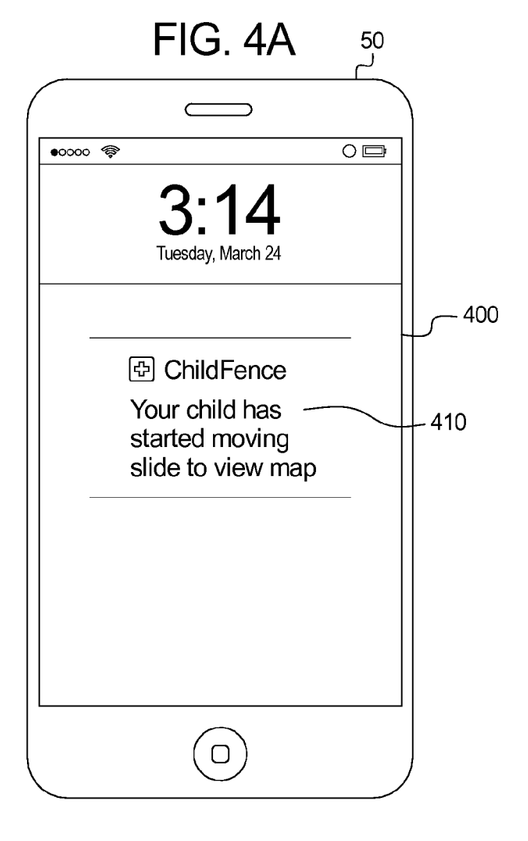
FIG. 4A is an example user device including a user device interface including a start motion notification.
Figure 4B:
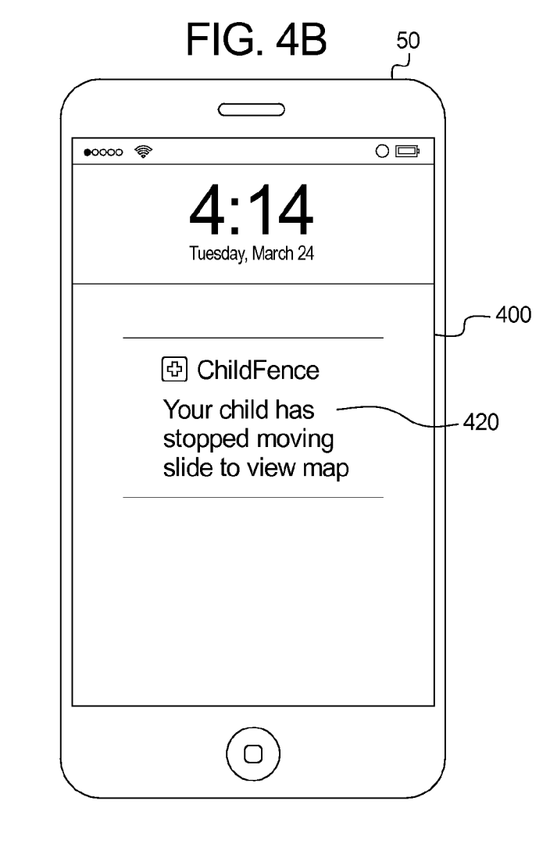
FIG. 4B is an example user device including a user device interface including a stop motion notification.

Turning to FIGS. 4A and 4B, the start motion message 76 and the stop motion message 78 may be communicated to the user device 50 as notifications through a variety of notification channels, such as SMS messaging, push messaging, email messaging, phone calls, social network messaging, mobile device notifications, etc. Notifications may include the current locations 25 of the asset device 30 and may include a mechanism to access a map showing the real-time location history 49 of the asset 30 to permit the user 60 to track the asset 20. As shown in FIG. 4A, the start motion message 76 may trigger the display of a start motion notification 410 on a user device interface 400 of the user device 50. Likewise, as shown in FIG. 4B, the stop motion message 78 may trigger a stop motion notification 420 on the user device interface 400.

In some embodiments, the start motion notification 410 or stop motion notification 420 may include an option to create a geofence 47. For example, the start motion notification 410 and the stop motion notification 420 may be received by the user device application 55. Upon receipt of the notifications, the user device application 55 may display a prompt to provide the user 60 the option of defining a geofence 47 around the asset's current location 25. The prompt may permit the user 60 to define a radius 385 around the current location of the asset 20.

Figure 5A:
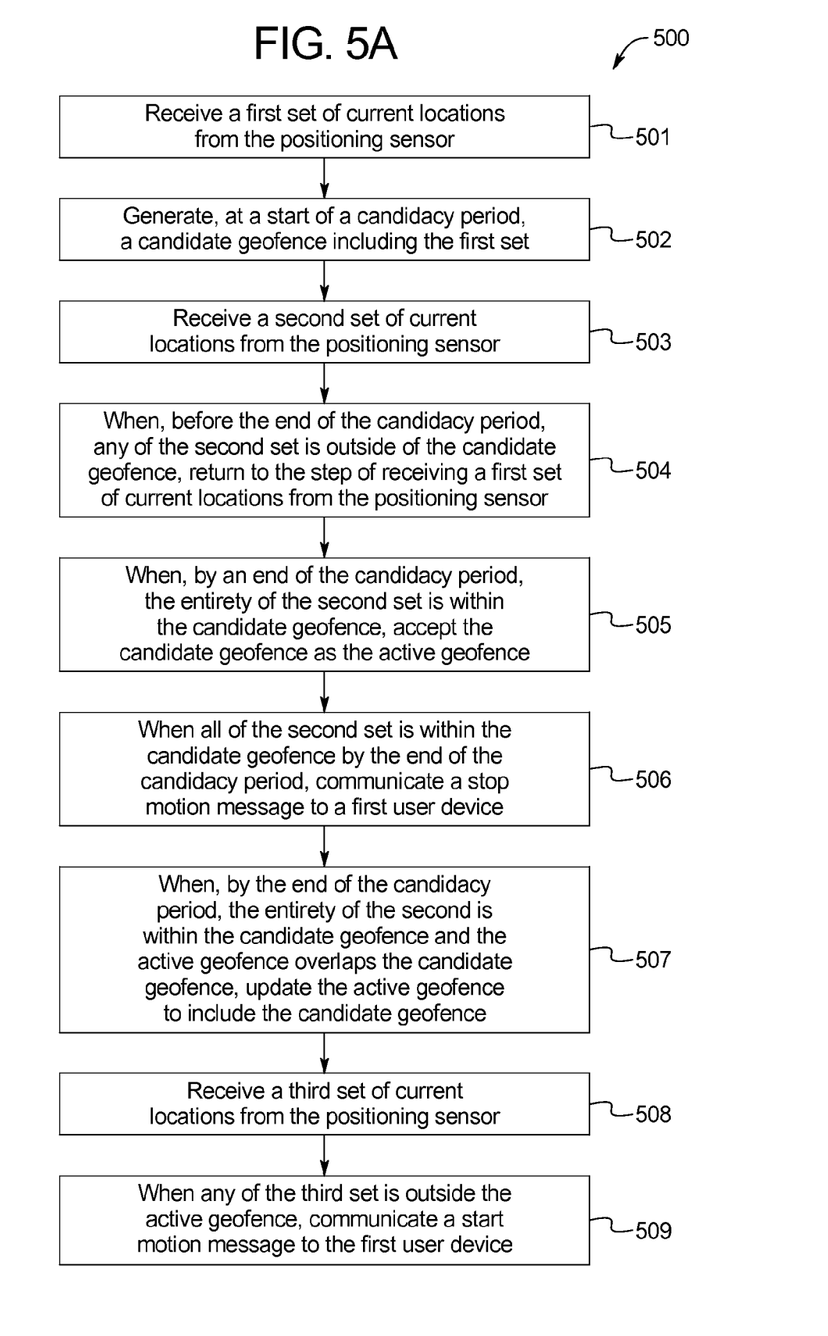
FIG. 5A is an example method that may be executed by the location-based tracking system of FIG. 1 to carry out the functionality described herein.

FIG. 5A illustrates method 500 that may be executed by the tracking system 10 in which positioning alerts are communicated to a first user device (such as a user device 50) from a second user device (such as an asset device 30). The tracking system 10 of the method 500 begins operation with the asset device 30 in motion, accordingly, the tracking system 10 may start by using the continuous test method to continuously check to determine whether the asset 20 has stopped moving.

First, at step 501, the tracking system 10 receives a first set of current locations 25 from the positioning sensor 112. Second, at step 502, the tracking system 10 generates, at a start of a candidacy period 382, a candidate geofence 380 including the first set. Third, at step 503, the tracking system 10 receives a second set of current locations 25 from the positioning sensor 112.

A set of current locations 25 may include one or more readings of the current location 25 of the asset device 30. For example, in an embodiment, a set of current locations is a single current location 25 of the asset device 30. In another embodiment, a set of current locations may include two readings, three readings, five readings, ten readings, twenty readings, fifty readings, one hundred readings, etc., of the current location 25. In an embodiment, a set of current locations 25 may include all readings of the current location 25 during a time period as may be received by the asset device application 35. Alternatively, a set of current location 25 may include a sample or subset of current locations 25 taken during a time period, as may be received by the asset device application 35. For example, in some embodiments, to reduce noise, a set of current locations 25 may exclude current locations 25 that statistically deviate from the other readings in the set, in order to, for example, exclude reading errors. A deviation threshold of one standard deviation or more, two standard deviations or more, three standard deviations or more, etc. may be used to exclude current locations 25.

If the candidate fence 380 is broken before the end of the candidacy period 382, the tracking system 10 may return to step 501 to start to generate a new candidate geofence 380. Thus, at step 504, when, before the end of the candidacy period 382, any of the second set is outside of the candidate geofence 380, the tracking system 10 returns to the step of receiving a first set of current locations 25 from the positioning sensor 112.

Alternatively, if the candidate fence 380 is not broken, the tracking system 10 may make the candidate geofence 380 the active geofence 350 and communicate a stop motion message 78. Therefore, at step 505, when, by an end of the candidacy period 382, the entirety of the second set of active locations 25 is within the candidate geofence 380, the tracking system 10 accepts the candidate geofence 380 as the active geofence 350. And, at step 506, when all of the second set is within the candidate geofence 380 by the end of the candidacy period 382, the tracking system 10 communicates a stop motion message 78 to a first user device.

At the end of the candidacy period 382, the tracking system may merge the candidate geofence 380 in the active geofence 380 if they overlap. Accordingly, at step 507, when, by the end of the candidacy period 382, the entirety of the second set is within the candidate geofence 380 and the active geofence 350 overlaps the candidate geofence 380, the tracking system 10 updates the active geofence 350 to include the candidate geofence 380.

Once the asset device 30 has come to a stop at a location, the tracking system 10 may then begin monitoring for the asset device 30 leaving the location. Therefore, at step 508, the tracking system 10 receives a third set of current locations 25 from the positioning sensor 112. Finally, at step 509, when any of the third set is outside an active geofence, the tracking system 10 communicates a start motion message 76 to the first user device.

Figure 5B:
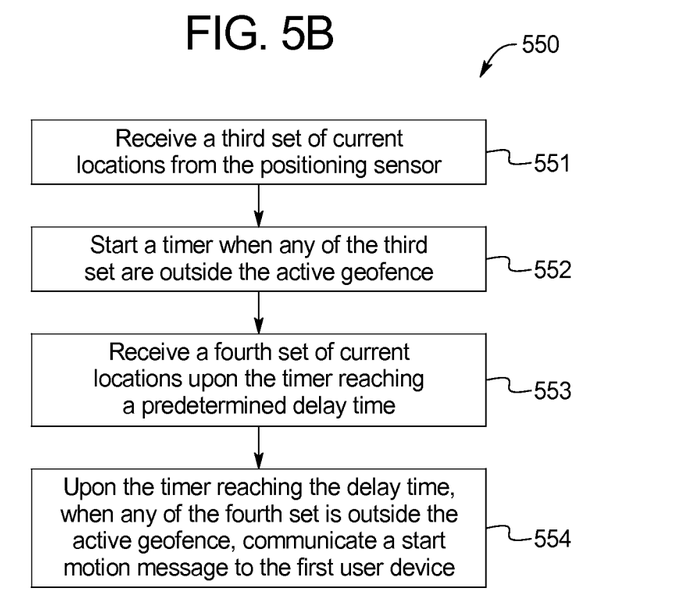
FIG. 5B is an example method that may be executed by the location-based tracking system of FIG. 1 to carry out the functionality described herein.

FIG. 5B illustrates a sub-method 550 that may replace steps 508 and 509 of the method 500 to provide a delay time before a start motion message is triggered. At step 551, after step 507, the tracking system 10 receives a third set of current locations 25 from the positioning sensor. Then, at step 552, the tracking system 10 starts a timer when any of the third set are outside the active geofence 350. Next, at step 553, the tracking system 10 receives a fourth set of current locations 25 upon the timer reaching a predetermined delay time 73. Finally, at step 554, upon the timer reaching the delay time 73, when any of the fourth set is outside the active geofence 350, the tracking system 10 communicates a start motion message 76 to the first user device.

In an embodiment, a stop motion trigger may 74 be met by the asset device 30 slowing below a velocity threshold. After a start motion trigger 72 has been triggered the asset device 30 may begin to continuously monitor its velocity. Once the velocity has dropped below a pre-determined velocity for a pre-determined period of time, the device may be determined to meet the stop motion trigger 74. The tracking system 10 may then communicate a stop motion message 78 to the asset device 30. Further, the tracking system 10 may then additionally generate an active geofence 350. In other embodiments, the deceleration of the asset device 30 may be used to determine that the asset 20 is moving in a vehicle coming to a stop, thus meeting a stop motion trigger 74.

In an embodiment, once a stop motion trigger 74 is met, the asset device 30 may continuously record the current location 25 of the asset device 30 until a start motion trigger 72 is met and assign each point recorded to a geofence 47. In this way, the asset device 30 may map out a new location to create a comprehensive geofence 47 around the recorded current locations 25. For example, if the child 310 is at school 330 and carrying the asset device 30, the asset device 30 may track the child 310 as the child 310 moves from classroom to classroom expanding the geofence to include each current location 25 visited.

In some embodiments, start motion triggers 72 and stop motion triggers 74 may be the output of machine learning or artificial intelligence algorithms (such as, for example, random forests, neural nets, etc.,) trained on the profiles 48 of one or more asset devices 30. For example, users 60 may define geofences 47 associated with asset devices 30 as a normal part of using the tracking system 10. A machine-learning model may then be trained using the location history 49 as an input and the defined geofences 47 as a supervisor signal. The tracking system 10 may use the machine-learning algorithm to determine start motion triggers 72 and stop motion triggers 74.

Other information, such as accelerometer data, Wi-Fi data, Bluetooth, may be collected by the asset device 30 and included in the profile 48 to further be utilized to determine whether a start motion trigger 72 or stop motion trigger 74 has been met. For example, the other information may also be used as inputs into the machine learning or artificial intelligence algorithms. Thus, for example, the tracking system 10 may learn to associate the detection of a school Wi-Fi network as a stop motion trigger 74, and/or may generate a geofence 47 including points where a school Wife network is detectable. Conversely, losing detection of the Wi-Fi network could be used as a start motion trigger 72.

Additionally, upon receiving a start motion message 76 or a stop motion message 78, the user device 50 may provide a prompt to permit a user 60 to provide feedback in order to refine the generation of geofences 47, for example, to further refine the machine learning or artificial intelligence algorithm. For example, if the user device 50 receives a start motion message 76, and the user 60 reviews the assets' current location 25 and determines the tracking system 10 erred, the user 60 may provide feedback to the tracking system 10 indicating that the asset 20 has not started moving to a new location. Alternatively, if the user device 50 receives a stop motion message 78, the user 60 may provide feedback to the user device 50 indicating that "the asset is still in motion."

Machine learning or artificial intelligence algorithms may further be utilized to determine the boundaries of a geofence 47. For example, in one embodiment, a clustering algorithm, such as hierarchical clustering may be used to cluster a portion of the location history 49 of the asset device 30 into multiple clusters, each of which may be used to generate a geofence 47. In one embodiment, a radial geofence 47 may be generated and centered on the centroid of a cluster, and may include a radius determined based on the variance of the location points 390 in the cluster. The geofence 47 may be added to the profile 48 in the database 46 of the tracking system 10. A stop motion trigger 74 may be met when the asset device 30 enters a geofence 47 of the profile 48.

In some embodiments, a stop motion trigger 74 may be met when the asset device 30 detects the nearby presence of a triggering device, such as a user device 50. For example, if a child 310 is in proximity to a teacher's user device 50, a parent may configure, using her own user device 50, an active geofence 350 to be generated around the teacher's user device 50. In some embodiments, the active geofence 350 may be updated as the teacher's user device 50 moves.

Referring back to FIG. 2, the asset device 30 includes a memory interface 102, controllers 42, such as one or more data processors, image processors and/or central processors, and a peripherals interface 106. The memory interface 102, the one or more controllers 42 and/or the peripherals interface 106 can be separate components or can be integrated in one or more integrated circuits. The various components in the asset device 30 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and positioning sensors 112 (e.g., GPS receiver, accelerometer) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the asset device 30 is intended to operate. For example, the asset device 30 can include communication subsystems 120 designed to operate over a GSM network, a GPRS network, an EDGE network, a Wi-Fi or Imax network, and a Bluetooth network. In particular, the wireless communication subsystems 120 may include hosting protocols such that the asset device 30 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a user interface 134, such as a touch screen. The user interface 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 44. The memory 44 can include high-speed random access memory and/or non-volatile memory, such as one or more magnetic disk storage devices, one or more optical storage devices, and/or flash memory (e.g., NAND, NOR). The memory 44 can store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 44 may also store communication instructions 142 to facilitate communicating with one or more additional devices, one or more computers and/or one or more servers 75. The memory 44 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 44 may also store other software instructions controlling other processes and functions of the asset device 30 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 44.

Each of the above identified instructions and applications can correspond to a set of instructions for performing one or more functions described herein. These instructions need not be implemented as separate software programs, procedures, or modules. The memory 44 can include additional instructions or fewer instructions. Furthermore, various functions of the asset device 30 may be implemented in hardware and/or in software, including in one or more signal processing and/or application specific integrated circuits. Accordingly, the asset device 30, as shown in FIG. 2, may be adapted to perform any combination of the functionality described herein.

Aspects of the systems and methods described herein are controlled by one or more controllers 42. The one or more controllers 42 may be adapted run a variety of application programs, access and store data, including accessing and storing data in associated databases, and enable one or more interactions via the asset device 30. Typically, the one or more controllers 42 are implemented by one or more programmable data processing devices. The hardware elements, operating systems, and programming languages of such devices are conventional in nature, and it is presumed that those skilled in the art are adequately familiar therewith.

For example, the one or more controllers 42 may be a PC based implementation of a central control processing system utilizing a central processing unit (CPU), memories and an interconnect bus. The CPU may contain a single microprocessor, or it may contain a plurality of microcontrollers 42 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 42 may further include appropriate input/output ports for interconnection with one or more output displays (e.g., monitors, printers, touchscreen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 42 may include a graphics subsystem to drive the output display. The links of the peripherals to the system may be wired connections or use wireless communications.

Although summarized above as a PC-type implementation, those skilled in the art will recognize that the one or more controllers 42 also encompasses systems such as host computers, servers, workstations, network terminals, and the like. Further one or more controllers 42 may be embodied in a device 10, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A tracking system in which positioning alerts are communicated to a first user device from a second user device, the tracking system comprising:
    a positioning sensor included in the second user device, wherein the positioning sensor determines a current location of the second user device;
    a controller in communication with the positioning sensor; and
    a memory in communication with the controller, the memory including instructions that when executed by the controller cause it to:
    receive a first set of current locations from the positioning sensor,
    generate, at a start of a candidacy period, a candidate geofence including the first set,
    receive a second set of current locations from the positioning sensor,
    when, by an end of the candidacy period, the entirety of the second set of current locations is within the candidate geofence, communicate a stop motion message to the first user device,
    receive a third set of current locations from the positioning sensor, and
    when any of the third set of current locations are outside an active geofence, start a timer,
    receive a fourth set of current locations upon the timer reaching a delay time, and
    upon the timer reaching the delay time, when any of the fourth set of current locations is outside the active geofence, communicate a start motion message to the first user device.

2. The system of claim 1, wherein the memory further includes instructions to:
    receive a fifth set of current locations between starting the timer and the timer reaching the delay time,
    upon the timer reaching the delay time, when the second set of current locations is within the active geofence, update the active geofence to include an area including the fifth set.

3. The system of claim 1, wherein the memory further includes instructions to:
    when, before the end of the candidacy period, any of the second set of current locations is outside of the candidate geofence, return to the step of receiving a first set of current locations from the positioning sensor.

4. The system of claim 1, wherein the memory further includes instructions to:
    when, by the end of the candidacy period, the entirety of the second set of current locations is within the candidate geofence, accept the candidate geofence as the active geofence.

5. The system of claim 1, wherein the memory further includes instructions to:
    when, by the end of the period, the entirety of the second set of current locations is within the candidate geofence and the active geofence overlaps with the candidate geofence, update the active geofence to include the candidate geofence.

6. The system of claim 1, wherein the controller and the memory are physically connected to the second user device.

7. The system of claim 1, wherein the controller and the memory are physically connected to a tracking server.

8. The system of claim 1, wherein the candidate geofence encompasses a radial area centered on the first set, wherein a radius of the radial area is user-selected.

9. The system of claim 1, wherein the step of communicating a stop motion message includes a communication using a web callback URL.

10. The system of claim 1, wherein the step of communicating the stop motion message to the first user device is accomplished by sending a first SMS message to the first user device, wherein the step of communicating the start motion message to the first user device is accomplished by sending a second SMS message to the first user device.

* * * * *